United States Patent [19]
Kumar et al.

[11] Patent Number: 5,287,464
[45] Date of Patent: Feb. 15, 1994

[54] SEMICONDUCTOR MULTI-DEVICE SYSTEM WITH LOGIC MEANS FOR CONTROLLING THE OPERATIONAL MODE OF A SET OF INPUT/OUTPUT DATA BUS DRIVERS

[75] Inventors: Niraj Kumar, Fremont; Ravi Narayanaswami, Newark; Hanumanthrao Nimishakavi, San Jose; Ikuji Nobugaki, Campbell, all of Calif.

[73] Assignee: Zilog, Inc., Campbell, Calif.

[21] Appl. No.: 602,502

[22] Filed: Oct. 24, 1990

[51] Int. Cl.⁵ .................................... G06F 13/00
[52] U.S. Cl. ..................... 395/325; 364/229; 364/231.5; 364/232.8; 364/232.9; 364/238.2; 364/240; 364/240.7; 364/252; 364/254.8; 364/260; 364/260.1; 364/260.2
[58] Field of Search ............... 395/325, 800, 425, 375, 395/250, 275

[56] References Cited
U.S. PATENT DOCUMENTS

| | | | |
|---|---|---|---|
| 4,402,044 | 8/1983 | McDonough et al. | 395/375 |
| 4,434,462 | 2/1984 | Guttag et al. | 395/375 |
| 4,450,519 | 5/1984 | Guttag et al. | 395/800 |
| 4,450,524 | 5/1984 | Oberman | 395/425 |
| 4,490,785 | 12/1984 | Strecker et al. | 395/325 |
| 4,494,193 | 1/1985 | Brahm et al. | 395/325 |
| 4,580,216 | 4/1986 | Bellay et al. | 395/800 |
| 4,609,985 | 9/1986 | Dozier | 395/425 |
| 4,935,894 | 6/1990 | Ternes et al. | 395/325 |
| 4,967,390 | 10/1990 | Redina et al. | 395/375 |
| 4,994,963 | 2/1991 | Rorden et al. | 395/325 |
| 5,025,412 | 6/1991 | Dalrymple et al. | 395/275 |
| 5,142,625 | 8/1992 | Nakai | 395/275 |

*Primary Examiner*—Allen R. MacDonald
*Assistant Examiner*—Ayaz R. Sheikh
*Attorney, Agent, or Firm*—Majestic, Parsons, Siebert & Hsue

[57] ABSTRACT

A semiconductor multi-device system incorporated on a single semiconductor chip is disclosed including a central processing unit, a bus, a plurality of peripherals, a plurality of on-chip data bus drivers connected to selected lines of the bus, and logic means for controlling the operation of the on-chip data bus drivers. The multi-device system of the invention is capable of interacting with off-chip components including an off-chip processing unit and off-chip peripherals. The off-chip components may also include a plurality of off-chip data bus drivers that drive data signals onto and off of an off-chip data bus. The on-chip and off-chip drivers must cooperate in order for data signals to transfer properly between the on-chip and off-chip components. The logic means of the invention is designed so as to minimize the logic necessary to cause the on-chip drivers and the off-chip drivers to cooperate properly. The logic means of the invention is also designed to function properly regardless of whether the on-chip processing unit or the off-chip processing unit is in control of the overall system comprising both on-chip and off-chip components. The logic means is also designed to control the operation of the on-chip drivers in a simple and efficient manner. Thus, a multi-device system is disclosed which is a significant improvement over those of the prior art.

15 Claims, 8 Drawing Sheets

| $L_0$ | $L_1$ | OPERATIONAL MODE OF DRIVERS |
|---|---|---|
| 0 | 0 | ISOLATE |
| 0 | 1 | OUTPUT |
| 1 | 0 | INPUT |
| 1 | 1 | INHIBITED |

MASTER MODE

| | I/O WRITE TO ON-CHIP PERIPHERALS | I/O READ FROM ON-CHIP PERIPHERALS | I/O WRITE TO OFF-CHIP PERIPHERAL | I/O READ FROM OFF-CHIP PERIPHERAL | WRITE TO MEMORY | READ FROM MEMORY | REFRESH | IDLE MODE |
|---|---|---|---|---|---|---|---|---|
| MODE OF DATA BUS DRIVERS (EMULATOR BIT=0) | OUT | Z | OUT | IN | OUT | IN | Z | Z |
| MODE OF DATA BUS DRIVERS (EMULATOR BIT=1) | OUT | OUT | OUT | IN | OUT | IN | Z | Z |

| | INTACK FOR ON-CHIP PERIPHERAL | INTACK FOR OFF-CHIP PERIPHERAL |
|---|---|---|
| MODE OF DATA BUS DRIVERS (EMULATOR BIT=0) | Z | IN |
| MODE OF DATA BUS DRIVERS (EMULATOR BIT=1) | OUT | IN |

FIG. 6.

SLAVE MODE

| | I/O WRITE TO ON-CHIP PERIPHERALS | I/O READ FROM ON-CHIP PERIPHERALS | I/O WRITE TO OFF-CHIP PERIPHERAL | I/O READ FROM OFF-CHIP PERIPHERAL | WRITE TO MEMORY | READ FROM MEMORY | REFRESH | EXT. BUS MASTER IS IDLE |
|---|---|---|---|---|---|---|---|---|
| MODE OF DATA BUS DRIVERS (EMULATOR BIT = 0) | IN | OUT | Z | Z | Z | IN | Z | Z |
| MODE OF DATA BUS DRIVERS (EMULATOR BIT = 1) | IN | OUT | Z | Z | Z | IN | Z | Z |

| | INTACK FOR ON-CHIP PERIPHERAL | INTACK FOR OFF-CHIP PERIPHERAL |
|---|---|---|
| MODE OF DATA BUS DRIVERS (EMULATOR BIT = 0) | OUT | IN |
| MODE OF DATA BUS DRIVERS (EMULATOR BIT = 1) | OUT | IN |

FIG. 7.

| INPUTS | | | | | OUTPUTS | |
|---|---|---|---|---|---|---|
| REME | BUSACK | ON CHIP/OFF CHIP INDICATOR | READ/WRITE | | $L_0$ | $L_1$ |
| 0 | 1 | 0 | 0 | | 0 | 1 |
| 0 | 1 | 0 | 1 | | 1 | 0 |
| 0 | 1 | 1 | 0 | | 0 | 0 |
| 0 | 1 | 1 | 1 | | 0 | 0 |
| 0 | 0 | 0 | 0 | | 0 | 0 |
| 0 | 0 | 0 | 1 | | 0 | 1 |
| 0 | 0 | 1 | 0 | | 1 | 0 |
| 0 | 0 | 1 | 1 | | 0 | 1 |
| 1 | 1 | 0 | 0 | | 0 | 1 |
| 1 | 1 | 0 | 1 | | 1 | 0 |
| 1 | 1 | 1 | 0 | | 0 | 0 |
| 1 | 1 | 1 | 1 | | 0 | 0 |
| 1 | 0 | 0 | 0 | | 0 | 1 |
| 1 | 0 | 0 | 1 | | 0 | 1 |
| 1 | 0 | 1 | 0 | | 1 | 0 |
| 1 | 0 | 1 | 1 | | 0 | 1 |

FIG. 8.

| BUSACK | READ/WRITE | OPERATIONAL MODE OF BUFFERS | SIGNAL ON LINE 47 |
|---|---|---|---|
| 0 | 0 | OUTPUT | 1 |
| 0 | 1 | INPUT | 0 |
| 1 | 0 | INPUT | 0 |
| 1 | 1 | OUTPUT | 1 |

SEMICONDUCTOR MULTI-DEVICE SYSTEM WITH LOGIC MEANS FOR CONTROLLING THE OPERATIONAL MODE OF A SET OF INPUT/OUTPUT DATA BUS DRIVERS

BACKGROUND OF THE INVENTION

This invention relates to semiconductor multi-device systems and specifically to a semiconductor multi-device system incorporated on a single semiconductor chip with a logic means for efficiently controlling the mode of operation of a set of on-chip data bus drivers.

In most systems using semiconductor devices, the devices comprising the system are discrete, that is, each device is formed on its own individual chip. To interconnect the devices together to form a system, each chip is electrically attached to a printed circuit board. The circuit board usually has an electrically conductive path pattern already formed upon it so that once the devices are attached to the board, they are electrically connected to each other as well. This type of system is referred to as a discrete system. In recent years, there has been a movement away from discrete systems toward a multi-device system wherein a plurality of devices, usually including a central processing unit, are formed on a single chip. In multi-device systems, the chip is itself a system with the interconnections between the different devices formed within the semiconductor material itself. Multi-device systems provide several advantages over discrete systems. First of all, because the entire system is incorporated on a single chip, no circuit board is needed. This results in a significant reduction in the physical size of the system. Also, because the entire system is solid state, the multi-device system is more reliable than the discrete system. The advantage of a discrete system is that it gives the buyer of the chips much more freedom because it is the buyer, not the chip manufacturer, that assembles the system. However, in many applications, it is the functionality and not the flexibility of the system that is the major concern. For these applications, multi-device systems are ideal.

Forming a multi-device system is not simply a matter of fabricating a plurality of discrete devices onto a single semiconductor chip and interconnecting them. Some considerations which were insignificant in a discrete system need to be taken into account in a multi-device system. One such consideration is that of data bus drivers. In a discrete system, each of the individual devices has its own set of data bus drivers to enable it to transfer data to and from the other devices. Equipping each device of a multi-device system with its own set of data bus drivers is impractical, however. Not only do these drivers require space on the chip but they also consume a certain amount of power even when they are not driving any signals. Thus, from both a space standpoint and a power standpoint, these drivers are inefficient. For these reasons, multi-device systems are usually equipped with only one set of data bus drivers which are shared by the different devices. For most multi-device systems, on-chip devices are typically directly connected to each other so that, internally, no data bus drivers are needed at all. Data bus drivers are only used to communicate with off-chip components and, for this reason, they are considered to be an interface between the multi-device system and the off-chip components. Because the data bus drivers behave as an interface, a logic means must be provided to control the drivers to ensure that they function properly in relation with the off-chip components. Frequently, the off-chip components have a set of data bus drivers of their own so that the logic means controlling the on-chip drivers should take the possible presence of the off-chip drivers into account. Otherwise, the on-chip drivers may interfere with the operation of the off-chip drivers and vice versa. This interfacing of the on-chip drivers and the off-chip drivers often requires very complicated logic and the more complex the logic, the more components are required to implement the logic. Thus, a logic means for controlling the on-chip bus drivers which simplifies the logic necessary to interface with the off-chip drivers would be desirable.

Typically, in a multi-device system, it is the on-chip central processing unit that controls access to the on-chip data bus. In some applications, however, it is desirable for an off-chip processing means to control access to the on-chip data bus. It would be desirable for the logic means controlling the operation of the bus drivers to be able to accommodate both types of arrangements.

It is an object of the invention to provide a multi-device system having a logic means for controlling the on-chip bus drivers which simplifies the logic necessary to interface with off-chip components including off-chip drivers.

Another object of the invention is to provide a multi-device system having a logic means for controlling the on-chip bus drivers which is capable of functioning properly regardless of whether the processing unit controlling access to the on-chip data bus is on-chip or off-chip.

SUMMARY OF THE INVENTION

In accordance with the objects of the invention, a multi-device system incorporated on a single semiconductor chip is provided comprising an on-chip processing unit, a bus, a plurality of on-chip peripherals, a plurality of on-chip data bus drivers connected to selected lines of the bus, and logic means for controlling the operation of the data bus drivers. In a preferred embodiment of the invention, the bus is divided into an address bus, a control bus, and a data bus. The on-chip processing unit generates address, control, and data signals which are carried on the address, control, and data buses, respectively. The on-chip peripherals are connected to the data bus to enable them to transfer data onto and off of the data bus. The on-chip peripherals are also connected to selected lines of the control bus so that they may be properly controlled. The multi-device system also includes a plurality of on-chip data bus drivers and a logic means for controlling the operation of the on-chip drivers.

The multi-device system of the invention is capable of interacting with various off-chip components including an off-chip processing unit, off-chip peripherals, and off-chip data drivers. Since the off-chip environment may include a processing unit, the overall system comprising both the multi-device system and the off-chip components may have more than one processing unit and this could cause serious problems. Two lines on the control bus, the bus request (BUSREQ) line and the bus acknowledge (BUSACK) line, are preferably dedicated to handling this situation. When the on-chip processing unit is in control of the overall system (master mode), it issues an inactive signal on the BUSACK line. When the off-chip processing unit wants control, it sends an active signal on the BUSREQ line to the on-chip processing unit. In response, the on-chip processing unit goes into an idle mode (slave mode) and relinquishes control to the off-chip processing unit. When the off-chip processing unit is finished with its operations, it sends an inactive signal on the BUSREQ line and the on-chip processing unit responds by regaining control and becoming the master of the overall system once again.

To transfer data between the on-chip components and the off-chip components, the on-chip drivers are connected between the on-chip data bus and a plurality of terminating conductors. Terminating conductors are ports of the multi-device system that electrically connect off-chip signals to the on-chip data bus and vice versa. The on-chip data bus drivers are preferably capable of operating in three modes: (1) output mode wherein the data signals on the on-chip data bus are driven onto the terminating conductors; (2) input mode wherein the signals appearing on the terminating conductors are driven onto the on-chip data bus; and (3) high impedance mode wherein the on-chip data bus is electrically isolated from the terminating conductors. The operation of the on-chip drivers are dictated by two control signals from the logic means.

The logic means of the invention comprises a decoding means, a direction control means, and a control register. The logic means receives as inputs address signals from the address bus, a read/write control signal and the BUSACK control signal from the control bus, and data signals from the data bus. The decoding means receives the address signals and determines whether an on-chip peripheral is being accessed. If so, the decoding means issues an activating signal to the desired on-chip peripheral. The decoding means further includes an OR gate which OR's together all of the activation lines of the on-chip peripherals. If none of the activation lines are activated, it is known that the desired peripheral is off-chip. Thus, the output of the OR gate may be used as an indicator signal which indicates whether the desired peripheral is on or off chip. The control register of the logic means contains an emulator bit which, when set, causes the logic means to cause the on-chip drivers to output data signals which would otherwise be completely internal to the multi-device system. The direction control of the logic means receives as input the read/write line, the BUSACK line, the output of the OR gate, and the emulator bit from the control register. From these input signals, it determines the mode in which the on-chip drivers should be operating.

When the on-chip processing unit is in master mode, the logic means causes the on-chip drivers to operate as follows. Assuming that the emulator bit is not set, for a write to an on-chip peripheral, the drivers are in output mode. For a read from an on-chip peripheral, the drivers are in high impedance mode. For a write to an off-chip peripheral, the drivers are in output mode. For a read from an off-chip peripheral, the drivers are in input mode. Assuming the emulator bit is set, for a read from an on-chip peripheral, the drivers are in output mode. The operation of the drivers remain the same for the other operations.

When the off-chip processing unit is in control (the on-chip processing unit is in slave mode), the on-chip drivers operate as follows. For a write to an on-chip peripheral, the drivers are in input mode. For a read from an on-chip peripheral, the drivers are in output mode. For either a read or a write operation with the off-chip peripherals, the drivers are in high impedance mode. When the off-chip processing unit is in control of the overall system, the emulator bit does not affect the operation of the on-chip data bus drivers.

By designing the logic means to function in this manner, the interface between the on-chip drivers and off-chip drivers is minimized. In fact, the only necessary interface is a XNOR gate. Also, the logic means is capable of functioning properly regardless of whether the on-chip or the off-chip processing unit is in control. Furthermore, the control of the on-chip drivers is achieved in a simple and efficient manner. Therefore, the invention provides a multi-device system which is superior to those of the prior art.

BRIEF DESCRIPTION OF THE DRAWINGS

FIG. 1 also shows various off-chip buses and components connected to the multi-device system to further illustrate the invention.

FIG. 5 illustrates the manner in which the decoder of the logic means activates the on-chip peripherals.

FIG. 6 is a table of the desired operational modes of the on-chip drivers under specified circumstances when the on-chip processing unit is in the master mode.

FIG. 7 is a table of the desired operational modes of the on-chip drivers under specified circumstances when the on-chip processing unit is in the slave mode.

FIG. 8 is a truth table for implementing the direction control means of the logic means.

DETAILED DESCRIPTION OF THE INVENTION

Multi-Device System

Figure 1:
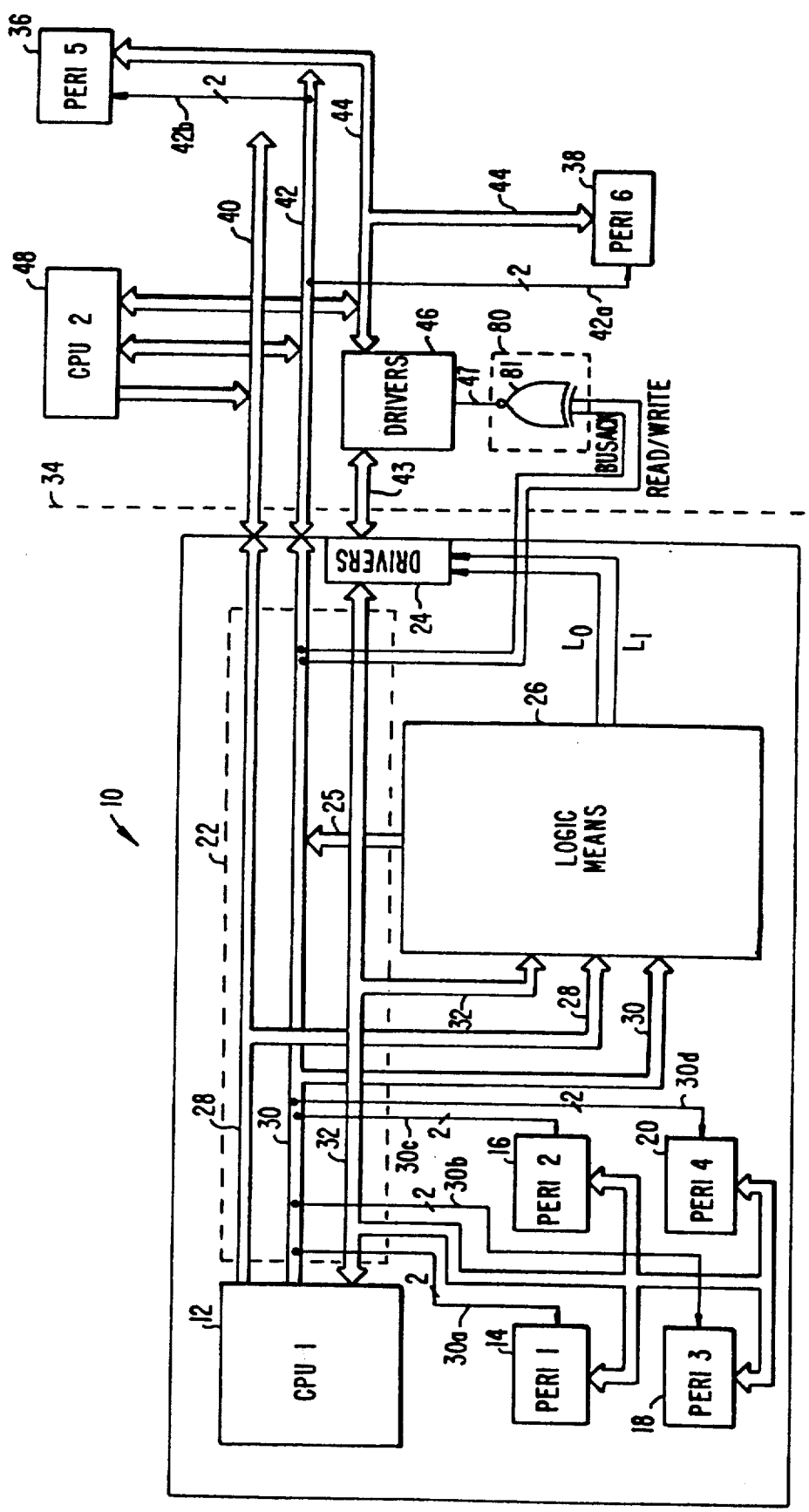
FIG. 1 is a block diagram of a multi-device system embodying the invention.

With reference to FIG. 1, a multi-device system 10 embodying the invention is shown comprising an on-chip processing unit 12, a bus 22, a plurality of on-chip peripherals 14-20, data bus drivers 24, and logic means 26. Bus 22 is shown in FIG. 1 as being divided into three separate buses: address bus 28, control bus 30, and data bus 32. It is not necessary for bus 22 to be subdivided in this manner, however, because bus lines may be multiplexed in such a manner that the same set of lines may be used for carrying more than one set of signals. For instance, address and control signals may be carried on the same bus if a proper multiplexing scheme is employed. Bus 22 is only divided as shown in FIG. 1 to simplify the discussion of the invention. The processing unit 12 is operative to generate address, control, and data signals which are carried on address bus 28, control bus 30, and data bus 32, respectively. For read operations, processing unit 12 receives data signals on data bus 32. Processing unit 12 is the central controlling unit of the multi-device system 10 and it is adapted to control the flow of data to and from the peripherals 14-20. On-chip peripherals 14-20 are connected to the data bus 32 to enable them to receive and send data to and from the processing unit 12. The peripherals 14-20 are also connected to selected lines of the control bus 30 to allow the processing unit 12 and the logic means 26 to control the operation of the peripherals 14-20. Specifically, each set of control lines 30a-30d connecting the control bus with the peripherals 14-20 includes a device enable line which enables the desired peripheral, and a read/write line which informs the peripheral whether a read or a write operation is to take place. Peripherals 14-20 may be a number of different devices such as memories, serial communication controllers, counter timer channels, etc. The devices incorporated into the multi-device system 10 depends upon the function of the particular multi-device system. The operation and construction of peripherals 14-20, processing unit 12, and bus 22 are well known in the art and need not be discussed in further detail herein.

Also included in the multi-device system 10 are data bus drivers 24 and logic means 26 for controlling the operation of the data bus drivers 24. The components to the left of dashed line 34 will hereinafter be referred to as the on-chip components and the components to the right of line 34 will be referenced as off-chip components. It should be noted that the on-chip components of the multi-device system 10 are directly wired to each other so that with regard to data signals within the on-chip system 10, the on-chip drivers 24 play no part. That is, for transactions between processing unit 12 and peripherals 14-20, on-chip bus drivers are not involved. The data bus drivers 24 only come into play when it is desirable for the system 10 to communicate with off-chip components such as peripherals 36 and 38 and off-chip processing unit 48. Before describing the operation of the on-chip drivers 24, it is necessary to first briefly discuss the possible off-chip environment.

Off-Chip Environment

As depicted by FIG. 1, the off-chip environment typically includes a plurality of peripherals 36 and 38, an address bus 40, a control bus 42, and a data bus 44. Off-chip address 40 and control 42 buses may usually be directly connected to the on-chip address 28 and control 30 buses as shown in FIG. 1. However, a set of off-chip drivers 46 are frequently interposed between the output of the on-chip drivers 24 and the off-chip data bus 44. The bus 43 connects the on-chip drivers 24 with the off-chip drivers 46. The two sets of drivers 24 and 46 must cooperate in order for data to be properly transferred between the on-chip components and the off-chip components. For this reason, the logic means 26 used to control the operation of the on-chip drivers must take into account the possible presence of the off-chip drivers 46. Like the peripherals 14-20 of the multi-device system 10, the off-chip peripherals 36, 38 are connected to a corresponding data bus 44 and to selected lines 42a, 42b of a corresponding control bus 42. The connections to the data bus 44 allow the peripherals 36, 38 to transfer data to and from other devices and connections to the control lines 42a, 42b allow the peripherals to be properly controlled. An off-chip processing unit 48 may also be included as part of the off-chip environment. Off-chip processing unit 48 is connected to the off-chip address 40, control 42, and data 44 buses in much the same manner that on-chip processing unit 12 is connected to the on-chip buses.

Because the off-chip environment may include a processing unit, there is a possibility that the overall system, comprising both on-chip and off-chip components, may have more than one processing unit. This may create serious complications unless a scheme is derived to handle such a situation. Two lines on the on-chip 30 and off-chip 42 control buses are specifically dedicated to this purpose. These two control lines, which are not specifically shown in FIG. 1, are the bus request line (BUSREQ) and the bus acknowledge line (BUSACK). The BUSREQ line may be viewed as an input control line to the multi-device system 10 and the BUSACK line may be viewed as an output control line from the multi-device system. When the on-chip processing unit 12 is in control of the overall system, which is the normal mode of operation, it outputs an inactive signal on the BUSACK line. An inactive signal on the BUSACK line indicates that the on-chip processor 12 is not acknowledging any bus request signals from any other device. Thus, an inactive signal on the BUSACK line means that on-chip processor 12 is in control or that it is in the master mode. When the off-chip processing unit 48 wants control of the overall system, it sends an active signal on the BUSREQ line. The on-chip processing unit 12 receives this signal and in response, it relinquishes control of the overall system to the off-chip processing unit 48 and outputs an active signal on the BUSACK line to indicate that it is acknowledging the bus request and, thus, is no longer in control or is in the slave mode. The on-chip processing unit 12 is idle while in the slave mode and it remains idle until the off-chip processing unit 48 outputs an inactive signal on the BUSREQ line, at which time, the on-chip processing unit 12 regains control of the overall system and outputs an inactive signal on the BUSACK line to indicate that it is once again in master mode. With regard to control of the on-chip data bus drivers 24, the status of the BUSACK control line is crucial because the operational mode of the drivers 24 greatly depends upon which processing unit is in control of the overall system. For instance, if it is known that a write operation to on-chip peripheral 14 is desired, logic means 26 must also ascertain which processing unit 12 or 48 is in control in order to determine whether the drivers 24 should drive signals into or away from the on-chip data bus 32. Thus, the status of the BUSACK line plays a vital role in controlling the operational mode of the on-chip drivers 24. The off-chip processing means has thus far been described as being a central processing unit but it should be noted that the off-chip processing means may also be a component such as a direct memory access (DMA) device which periodically requires control of the on-chip data bus 32. The term off-chip processing means is intended to include any device which may occasionally require control of the on-chip data bus 32.

On-Chip Drivers

Figures 2, 3:
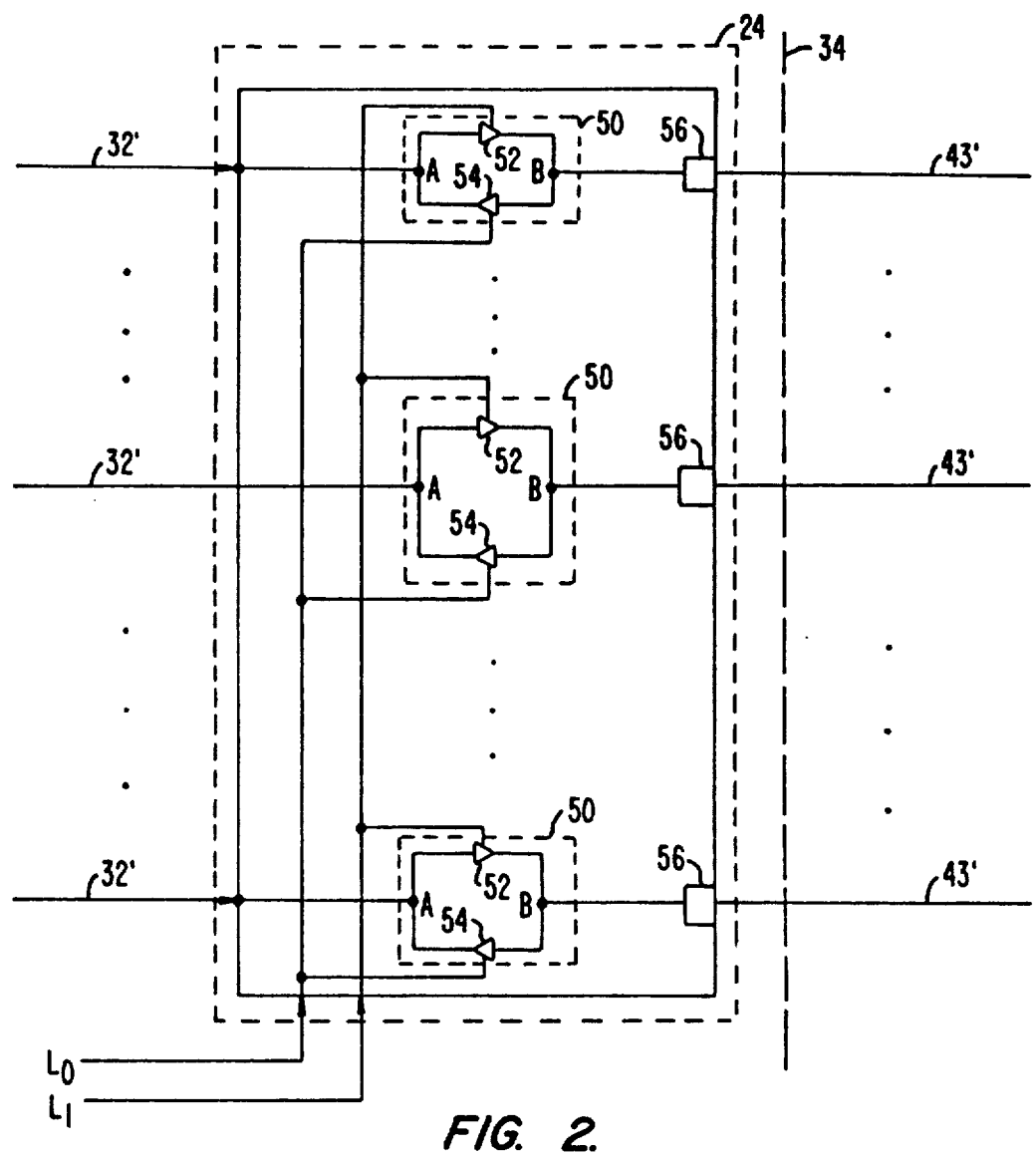
FIG. 2 is a detailed depiction of the on-chip data bus drivers of the multi-device system of the invention showing the individual drivers that comprise the on-chip data bus drivers.
FIG. 3 is a table showing the operational mode of the on-chip drivers with respect to the driver control signals $L_0$ and $L_1$.

To more clearly illustrate the invention, a more detailed view of the on-chip drivers 24 is provided in FIG. 2 wherein drivers 24 comprise a plurality of individual drivers 50 with each individual driver having an output buffer 52 and an input buffer 54. The operation of these buffers 52, 54 is controlled by control lines $L_0$ and $L_1$ from the logic means 26 (FIG. 1). Each of the individual drivers 50 has one terminal A connected to one of the lines 32' of the on-chip data bus 32, and the other terminal B connected to a terminating conductor 56. Terminating conductor 56 is a port of the multi-device system 10 that electrically connects off-chip signals to the on-chip data bus and vice versa. To be consistent with FIG. 1, terminating conductors 56 are shown in FIG. 2 as being connected to the lines 43' of the bus 43 between the on-chip drivers 24 and the off-chip drivers 46.

The operational mode of the drivers 50 depends upon the signal levels of the control lines $L_0$ and $L_1$. If a logic 0 appears on both control lines, both of the buffers 52, 54 are tri-stated. That is, both buffers are put into a high impedance mode which electrically isolates the bus line 32' from the terminating conductor 56. If a logic 0 appears on line $L_0$ and a logic 1 appears on line $L_1$, output buffer 52 will be activated while input buffer 54 will be deactivated causing the individual driver 50 to be in output mode. In output mode, signals appearing on data line 32' will be driven by output buffer 52 onto the terminating conductor 56 as well as any line electrically attached to terminating conductor 56 such as line 43' of bus 43. In this manner, on-chip data signals may be transferred to off-chip components. If a logic 1 appears on line $L_0$ and a logic 0 appears on line $L_1$, input buffer 54 will be activated and output buffer 52 will be deactivated causing driver 50 to be in input mode. This causes individual driver 50 to drive any signals appearing at the terminating conductor 56 onto line 32' of the on-chip data bus 32. External data signals may thus be transferred into the multi-device system. The case where a logical 1 appears on both lines $L_0$ and $L_1$ should be inhibited because both buffers 52, 54 should never be activated simultaneously. One of the main functions of logic means 26 is to prevent just such a situation. A table summarizing the operational mode of individual drivers 50 with respect to the levels of the control lines $L_0$ and $L_1$ is provided in FIG. 3.

Logic Means

Figure 4:
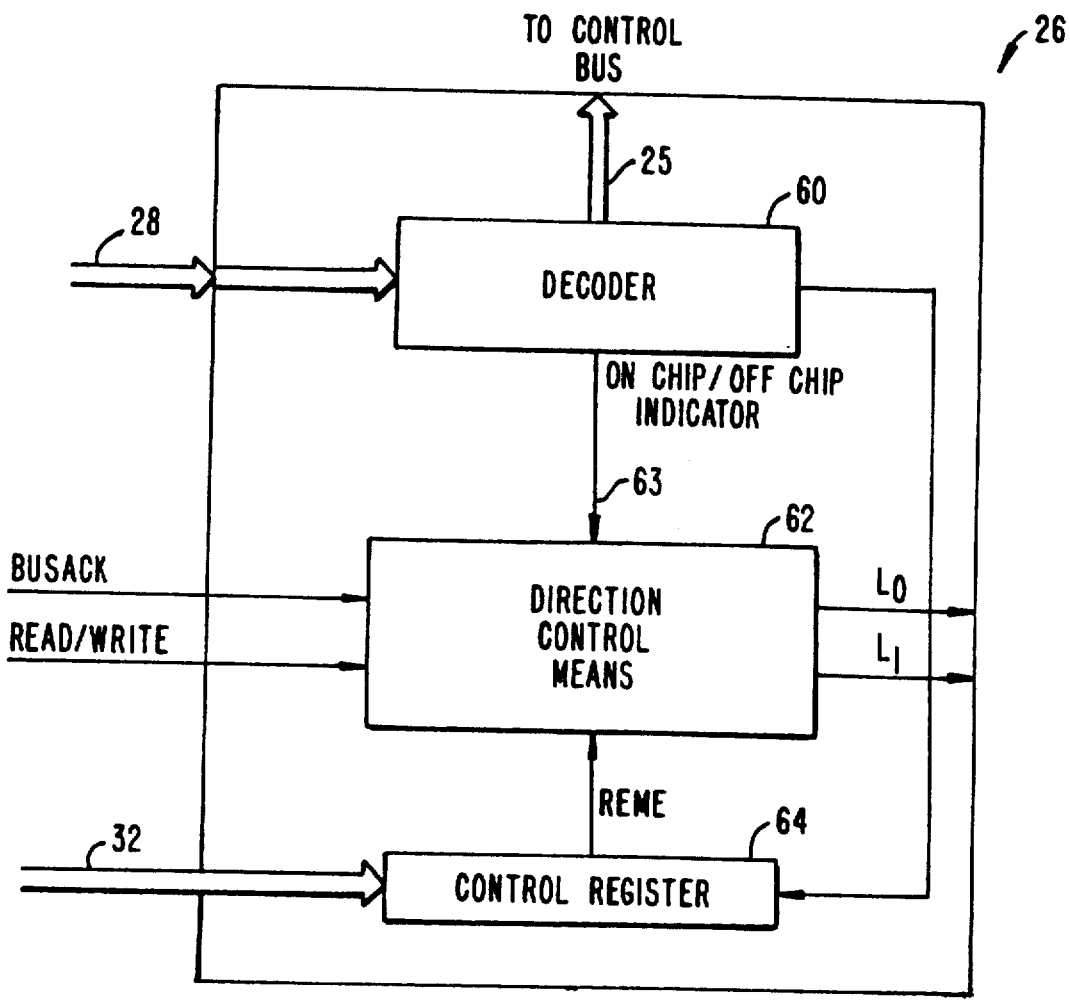
FIG. 4 is a detailed diagram of the logic means of the invention.
Figure 5:
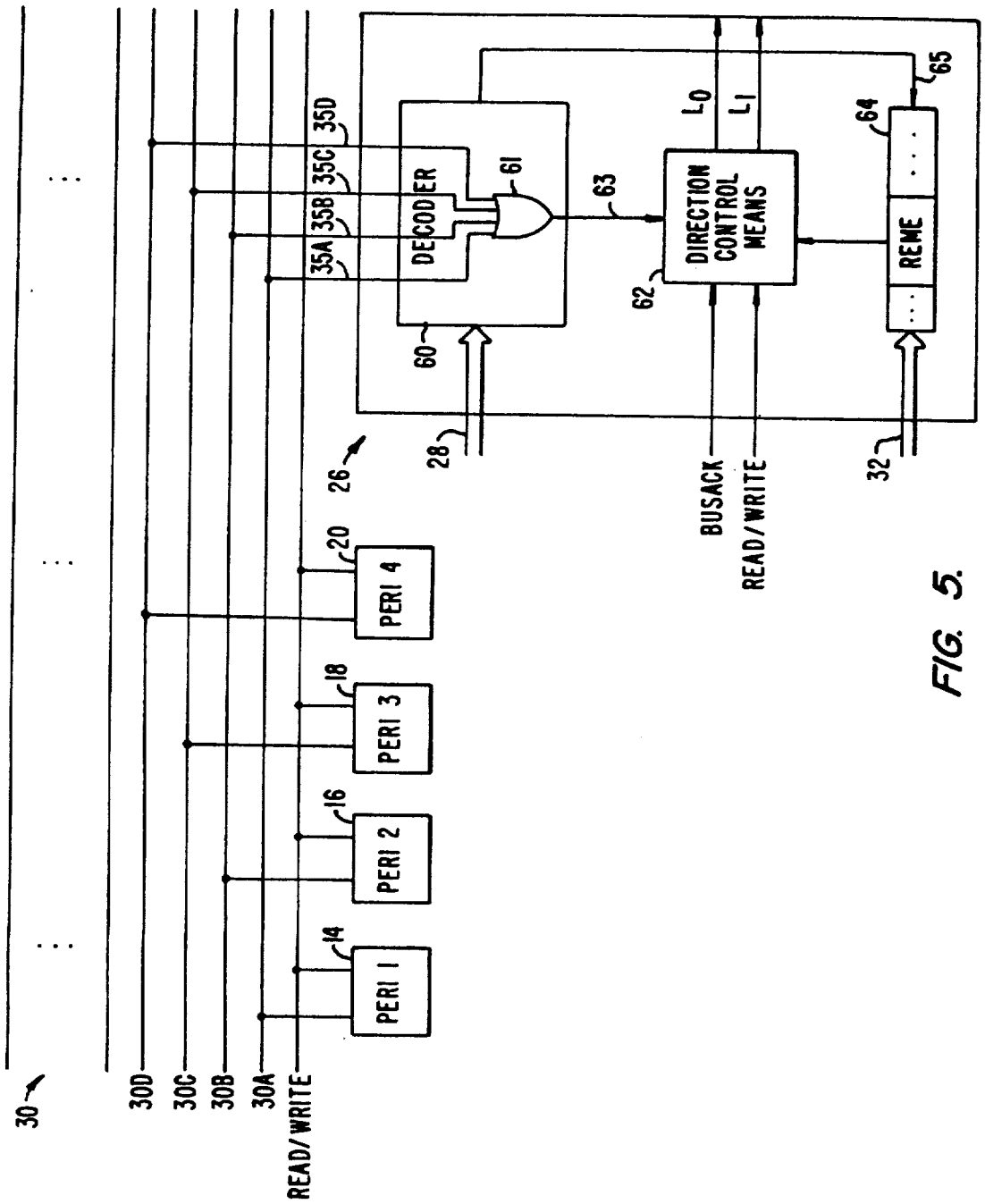
FIG. 5 is a detailed diagram of a subsection of the multi-device system of the invention. Specifically.

To more clearly illustrate the invention, a more detailed diagram of logic means 26 (FIG. 1) is given in FIG. 4 wherein the logic means 26 comprises a decoder 60, a direction control means 62, and a control register 64. As shown in FIG. 1, logic means 26 receives as inputs address signals via address bus 28, selected control signals via control bus 30, and data signals via data bus 32. Logic means 26 outputs a plurality of control signals onto control bus 30 via control lines 25 and driver control signals via lines $L_0$ and $L_1$. Referring again to FIG. 4, the address signals received from the address bus 28 are fed to the decoder 60 where the address is decoded. If, upon decoding, the address corresponds to one which has been allocated to one of the on-chip peripherals 14-20, an appropriate device enable signal is outputted onto one of the control lines 25. This device enable signal is in turn conveyed to the proper on-chip device and the device is activated. To elaborate, reference is made to FIG. 5 wherein on-chip peripherals 14-20 are shown along with logic means 26. Each of the peripherals 14-20 is connected to two lines of the on-chip control bus 30 and the decoder 60 is also connected to selected lines of the control bus 30 via control lines 35A-35D. As the decoder receives an address from address bus 28, it decodes the address and determines whether the address corresponds to any address which has been allocated to the on-chip peripherals 14-20. If so, the decoder further determines to which peripheral the address has been allocated and sends a device enable signal to the proper peripheral.

For example, suppose that the address received by decoder 60 is one which has been allocated to peripheral 14. The decoder, in response to this address, will put a logic 1 signal onto line 35A. This activation signal travels from line 35A to control line 30A to peripheral 14, thus activating the peripheral 14. Once activated, peripheral 14 will check the status of the read/write control line and determine whether a read or a write operation is desired. Any of the peripherals 14-20 may be thus activated. For addresses that do not correspond to any that have been allocated to the on-chip peripherals 14-20, the decoder will not output any activating signals at all on lines 35A-35D.

Decoder 60 also comprises an OR gate 61 which performs an ORing function on the signals found on lines 35A-35D. If any of the lines 35A-35D contains a logic 1 signal, i.e. if any of the on-chip peripherals 14-20 are activated, the output 63 of the OR gate 61 will be a logic 1. Otherwise, the output 63 is a logic 0. By monitoring the output 63 of the OR gate, it is possible to ascertain whether an on-chip device or an off-chip device is being accessed. Thus, the output 63 of the OR gate 61 may be used as an on-chip/off-chip indicator. The allocation of addresses to selected peripherals is highly arbitrary and is dependent upon the configuration of the particular system. As a result, the decoder used is also highly dependent upon the particular system. Since decoders are well known in the art and may be readily designed by one skilled in the art to fit any particular system, the specific construction of decoder 60 need not be discussed herein.

Logic means 26 also includes a control register 64 which contains as one of its bits an emulator bit REME. The control register 64 may be accessed by the on-chip processing unit 12 and the contents of the register 64 may be altered thereby. To access the register 64, the processing unit 12 outputs the appropriate address to the decoder 60 and the decoder 60 responds by sending an activating signal to the register 64 on line 65. Once activated, the data from data bus 32 are loaded into the control register 64. The emulator bit REME, when set, allows an off-chip apparatus such as a tester to monitor the data signals internal to the multi-device system. These internal data signals may otherwise be inaccessible to the off-chip world.

The logic means 26 further comprises direction control means 62 which receives as inputs selected lines from the on-chip control bus 30. Specifically, direction control means 62 receives from the control bus 30 the BUSACK control line and the read/write control line. Direction control means 62 also receives as input the output 63 of the OR gate 61. As previously stated, this signal is used to determine whether the desired peripheral is on-chip or off-chip. Direction control means 62 further receives as input the emulator bit REME from the control register 64. Based on all of these inputs, the direction control means 62 determines what signals are outputted onto direction control lines $L_0$ and $L_1$ to control the operational mode of the data bus drivers 24. The general operation of direction control means 62 will now be described.

General Operation of Direction Control Means

A table summarizing the operational mode of the on-chip data bus drivers 24 (FIG. 1) under specific conditions is provided in FIG. 6. The table in FIG. 6 assumes that the on-chip processing unit 12 is operating in the master mode. In other words, the on-chip processing unit 12 is assumed to be in control of the overall system comprising both the multi-device system 10 and the off-chip components. The table in FIG. 6 also assumes, for illustrative purposes only, that the memory of the overall system is kept off-chip. It should be noted, however, that the memory may also be kept on-chip as one of the on-chip peripherals 14-20. Referring to FIG. 1 and to the first row of FIG. 6 wherein the emulator bit REME is reset (REME=logic 0), on any write operation from the on-chip processing unit 12 to any of the on-chip peripherals 14-20, the direction control means 62 causes the data bus drivers 24 to be put into output mode. This means that even though the data signals on the on-chip data bus 32 are only intended for on-chip peripherals 14-20, they are nonetheless conveyed to the off-chip components as well. It is not vital that the drivers 24 operate in output mode under these conditions but the logic necessary for implementing direction control means 62 is simplified if this is so.

For the on-chip processing unit 12 to read data from one of the on-chip peripherals 14-20, the data drivers 24 must be put into the z or high impedance mode so that the on-chip data bus 32 is isolated from any signals coming from off-chip components. The isolation of the on-chip data bus 32 is important here because it prevents any off-chip signals from interfering with the on-chip data signals that are being conveyed from the on-chip peripherals 14-20 to the on-chip processing unit 12. The isolation of the on-chip data bus 32 under this condition also simplifies the logic necessary to interface with the off-chip drivers 46. The entire read operation is thus internal to the multi-device system 10.

For write operations to off-chip peripherals 36 or 38, direction control means 62 must put the drivers 24 into the output mode. Otherwise, the data signals originating from processing unit 12 would have no way of reaching the off-chip peripherals 36, 38. Likewise, in order for processing unit 12 to read data from an off-chip peripheral 36, 38, direction control means 62 must put the drivers 24 into input mode to create a path by which signals on the off-chip data bus 44 may reach the on-chip data bus 32.

In the case of interrupts from either on-chip or off-chip peripherals, the same principles apply. When the on-chip processor 12 acknowledges an interrupt signal from one of the on-chip peripherals 14-20, it is known that data will subsequently be flowing from one of the on-chip peripherals 14-20 to the processing means 12. This is analogous to the case where data is read from one of the on-chip peripherals 14-20. To prevent any off-chip signals from interfering with the data signals being conveyed from an on-chip peripheral to the processing unit 12, the data bus drivers 24 must operate in the high impedance mode in this situation. When the processor 12 acknowledges an interrupt signal from one of the off-chip peripherals 36, 38, the data bus drivers 24 need to operate in the input mode in order to drive signals from the off-chip peripherals 36, 38 onto the on-chip data bus 32.

In the second row of the table of FIG. 6, the operational mode of the drivers 24 under similar conditions is given except that the emulator bit REME is now set (REME=logic 1). By comparing the first and second rows of the table, it can be seen that the setting of the emulator bit REME only alters the operational mode of the drivers 24 when the processing unit 12 reads data from one of the on-chip peripherals 14-20 and when the processing unit 12 acknowledges an interrupt signal from one of the on-chip peripherals. As previously stated, the purpose of the REME bit is to allow an off-chip apparatus such as a tester to monitor signals that would otherwise be completely internal to the multi-device system. Since the data signals from peripherals 14-20 to processing unit 12 would otherwise be invisible to off-chip components, setting the emulator bit represents the only means by which off-chip components may have access to these signals.

Thus far, the operation of the direction control means 62 has been described assuming that the on-chip processing unit 12 is in the master mode. The direction control means 62 is also capable of operating properly when the on-chip processing unit 12 is in the slave mode, i.e. the off-chip processing unit 48 is in control of the overall system. The table provided in FIG. 7 summarizes the operational mode of the drivers 24 under specific conditions assuming that the off-chip processing unit 48 is in control. Like FIG. 6, the table of FIG. 7 also assumes for illustrative purposes only that memory is kept off-chip. According to the first row of the table in FIG. 7 wherein the REME bit is reset, to transfer data from the off-chip processing unit 48 to one of the on-chip peripherals 14-20, the direction control means 62 must put the drivers 24 into input mode. This is logical since the off-chip data signals need to be driven onto the on-chip data bus in order to reach one of the on-chip peripherals 14-20.

When the off-chip processing unit 48 wishes to read data from one of the on-chip peripherals 14-20, the data bus drivers 24 must be put into output mode in order to drive the data signals from the on-chip peripherals 14-20 onto the off-chip data bus 44. When the off-chip processing unit wishes to write data to one of the off-chip peripherals 36, 38, the on-chip drivers 24 must be put into the z or high impedance mode so that the on-chip data bus 32 is electrically isolated from any signals on the off-chip data bus 44. It is possible to put the drivers 24 into input mode under these conditions but this is undesirable for two reasons. First of all, putting the off-chip data signals onto the on-chip bus 32 causes the signals on the on-chip bus 32 to fluctuate and this creates noise which might affect the signals on the off-chip data bus 44. Second, the drivers 24 consume considerably more power when they are in the input mode than when they are in the high impedance mode. Thus, from both a noise and a power standpoint, it is preferable to put the drivers 24 into high impedance mode under these conditions.

For the case where the off-chip processing unit 48 wishes to read data from one of the off-chip peripherals 36, 38, it is vital that the on-chip drivers 24 be put into the high impedance mode. This prevents possible bus contention on the off-chip data bus 44. The significance of the high impedance mode under these conditions will become apparent when the interface between the on-chip 24 and off-chip 46 drivers is discussed.

The off-chip processing unit 48 may also have the capability of handling interrupt signals received from either on-chip peripherals 14-20 or off-chip peripherals 36, 38. In this case, the on-chip data bus drivers should function as follows. When the off-chip processing unit 48 acknowledges an interrupt signal from one of the on-chip peripherals 14-20, the data bus drivers 24 must be put into output mode to drive the signals on the on-chip data bus 32 onto the off-chip data bus 44. When the off-chip processing unit 48 acknowledges an interrupt signal from one of the off-chip peripherals 36, 38, the on-chip data bus drivers 24 preferably are in input mode so as not to drive any signals onto the off-chip data bus 44. This prevents possible bus contention.

When the off-chip processing nit 48 is in control of the overall system, the emulator bit REME does not alter the operational mode of the on-chip drivers 24. Thus, the first and second rows of the table of FIG. 7 are identical.

To implement the read and write functions described by the tables in FIG. 6 and 7, the direction control means 62 should be constructed in accordance with the truth table shown in FIG. 8. For the purposes of FIG. 8, a 0 on the BUSACK line indicates an inactive signal and a 1 indicates an active signal. Likewise, a 0 on the REME line indicates that the bit is reset and a 1 indicates that the bit is set. According to the truth table and according to FIG. 5, the direction control means 62 receives as inputs the BUSACK control line, the read/write control line, the output 63 of the OR gate 61 which acts as an on-chip/off-chip indicator, and the emulator bit REME from the control register 64. The direction control means 62 outputs two control signals on lines $L_0$ and $L_1$ for controlling the operation of the on-chip drivers 24. From the input signals, the direction control means 62 can ascertain whether the on-chip processor 12 or the off-chip processor 48 is in control of the overall system, whether the peripheral being accessed is on-chip or off-chip, whether the desired operation is a read or a write operation, and whether data signals which would otherwise be inaccessible should be outputted to the off-chip environment. Based on combinations of these factors, the direction control means 62 can output driver control signals on lines $L_0$ and $L_1$ which properly control the operational mode of the on-chip drivers.

Off-Chip Drivers

Figures 9, 10:
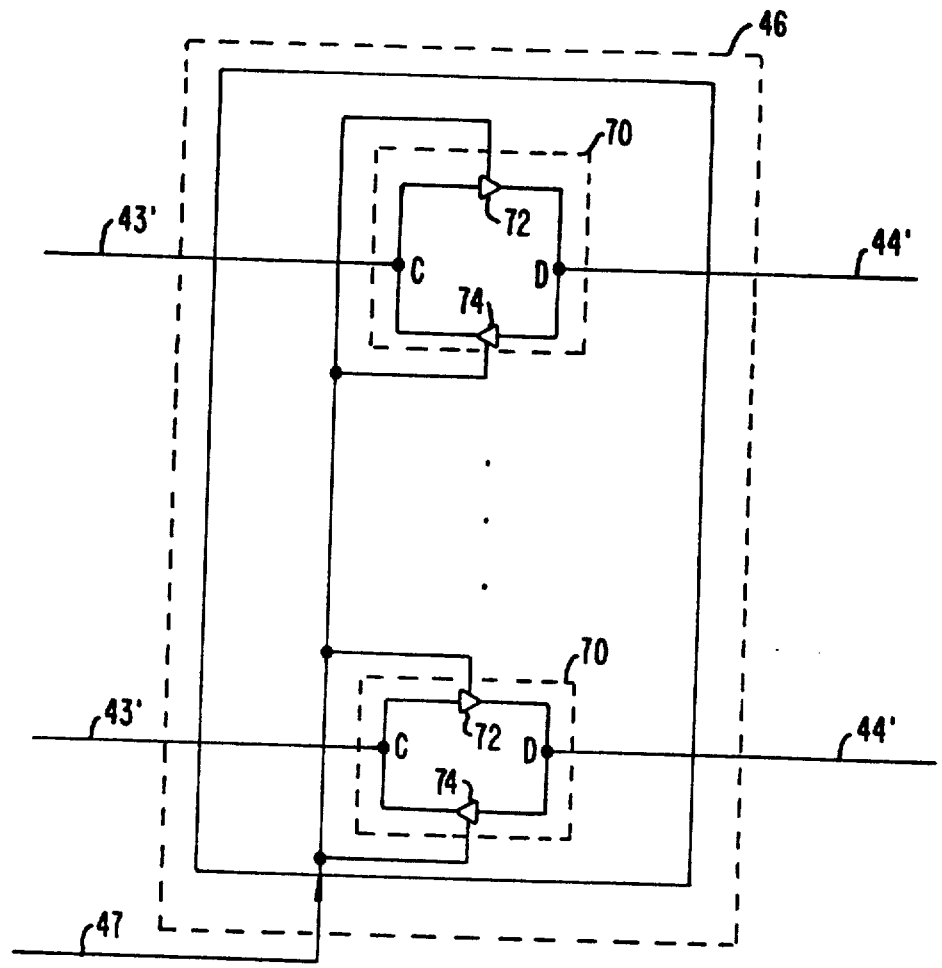
FIG. 9 is a detailed diagram of the off-chip data bus drivers depicting the individual drivers that comprise the off-chip data bus drivers.
FIG. 10 is a table showing the operational mode of the off-chip data bus drivers with respect to the BUSACK and the read/write control signals on the on-chip control bus.

Before describing the interface between the on-chip drivers 24 and the off-chip drivers 46, a brief description of the off-chip drivers 46 is necessary. Referring to FIG. 9, off-chip drivers 46 comprises a plurality of individual drivers 70 with each individual driver 70 having an output buffer 72 and an input buffer 74. The buffers 72, 74 are controlled by control line 47 which comes from the interface 80 (FIG. 1) between the on-chip drivers 24 and the off-chip drivers 46. Individual driver 70 has one of its terminals C connected to one of the bus lines 43' of bus 43, and its other terminal D connected to one of the lines 44' of the off-chip data bus 44. Since the buffers 72, 74 are controlled by only one control line 47, one of them must be activated low. That is, one of the buffers 72, 74 must be enabled when a logic 0 appears on line 47. For illustrative purposes, it is assumed that output buffer 72 is activated by a logic 1 and input buffer 74 is activated by a logic 0. At any one time, one and only one of the buffers 72, 74 is activated. Thus, individual driver 70 can only be in input or output mode. In output mode, any signal received at terminal C from line 43' is driven by buffer 72 onto line 44'. In input mode, any signal received at terminal D from line 44' is driven by buffer 74 onto line 43'. Whether individual driver 70 is in input or output mode depends upon the status of the control signal on control line 47 from the interface 80.

Interface Between On-Chip and Off-Chip Drivers

One of the objects of the invention is to provide a logic means for controlling the operational mode of the on-chip data bus drivers 24 which would simplify the logic necessary to interface the on-chip drivers 24 with the off-chip drivers 46. This object is achieved because the only interface required to cause the on-chip and off-chip drivers to cooperate properly is XNOR gate 81 (FIG. 1). The XNOR gate 81 receives as inputs the BUSACK line and the read/write line from the on-chip control bus 30 and outputs on control line 47 a control signal for controlling the operational mode of the off-chip drivers 46. A truth table showing the signal output levels on the control line 47 for different combinations of input signal levels is provided in FIG. 10.

It was previously mentioned that, for the case where the off-chip processing unit 48 is in control and it wishes to read data from one of the off-chip peripherals 36, 38, it is vital that the on-chip drivers 24 be put into the high impedance mode to prevent possible bus contention on the external data bus 44. This will be explained with reference to FIGS. 1 and 10. The first row of FIG. 10 shows that when BUSACK is active and read/write is low (which corresponds to a read operation initiated by the off-chip processing unit 48), the drivers 46 are driving any signals received from intermediate bus 43 onto the off-chip data bus 44. This is occurring at the same time that the off-chip peripherals 36, 38 are outputting data onto the off-chip data bus 44. Thus, bus contention will result if any signals are present on intermediate bus 43. However, since the logic means 26 is specifically designed to cause the on-chip drivers 24 to be in the high impedance mode under these circumstances, no signals will appear on intermediate bus 43. Thus, bus contention is averted. A careful analysis of FIGS. 8 and 10 will show that, under all possible conditions, on-chip drivers 24 and off-chip drivers 46 do indeed cooperate to allow data to transfer properly between the on-chip and the off-chip components.

The invention as described achieves all of the objects of the invention. A multi-device system is provided having a logic means for controlling the operation of the on-chip drivers which simplifies the logic necessary to interface the on-chip data bus drivers with the off-chip data bus drivers. The logic means of the system is also capable of operating properly regardless of whether an on-chip processing unit or an off-chip processing unit is in control of the overall system. In addition, the logic means of the invention controls the operation of the on-chip drivers in a simple and efficient. Thus, a multi-device system is provided which is a significant improvement over the multi-device systems of the prior.

Although the invention has been described with reference to specific embodiments, the invention should not be construed to be so limited. Various modifications may be made by one of ordinary skill in the art with the benefit of this disclosure without departing from the spirit of the invention. Therefore, the invention should not be limited by the examples used to illustrate it but only by the scope of the appended claims.

What is claimed is:

1. A semiconductor multi-device system incorporated on a single semiconductor chip capable of interacting with off-chip peripherals, said multi-device system comprising:

bus means for carrying address signals, data signals and control signals;

at least one on-chip peripheral connected to said bus means;

an on-chip processing unit connected to said bus means for generating onto said bus means, a read control signal and an address signal uniquely associated with one of said on-chip or off-chip peripherals;

logic means connected to said bus means, for receiving said read control signal and said address signal from said processing unit, and generating at least two logic signals in response thereof;

a plurality of data bus drivers responsive to said at least two logic signals generated by said logic means and connected to said bus means for driving data signals on and off said bus means, said plurality of data bus drivers selectably operating in one of at least three modes in response to said at least two logic signals; and a plurality of terminating conductors connected to said plurality of data bus drivers, said plurality of terminating conductors providing connections for said off-chip peripherals;

wherein said at least three modes of said plurality of data bus drivers include: (1) an output mode wherein data signals received from said bus means are driven onto said plurality of terminating conductors, (2) an input mode wherein data signals appearing on said terminating conductors are driven onto said bus means, and (3) a high impedance mode wherein said bus means is electrically isolated from said terminating conductors; and wherein said at least two logic signals generated by said logic means cause said data bus drivers to operate in high impedance mode when said processing unit generates a read control signal and an address signal corresponding to a read operation to read data from at least one of said on-chip peripherals.

2. The multi-device system of claim 1 wherein said processing unit also generates onto said bus means an emulator signal and said logic means also receives as input said emulator signal which, when set to logic 1, causes said logic means to generate at least two logic signals which cause said data bus drivers to operate in the output mode when said on chip processing unit generates a read control signal and an address signal corresponding to a read operation to read data from at least one of said on-chip peripherals, thereby allowing said off-chip peripherals to also read the data being read by said on-chip processing unit.

3. The system of claim 1, said processing means further generating a write control signal, and said logic means further receiving said write control signal as input, and generating in response thereof, logic signals which cause said data bus drivers to operate in the output mode when said processing unit generates a write control signal and an address signal corresponding to a write operation to write data to at least one of said on-chip peripherals.

4. The system of claim 3 wherein said logic means generates logic signals which cause said data bus drivers to operate in the output mode when said processing unit generates a write control signal and an address signal corresponding to a write operation to write data to an off-chip peripheral.

5. The system of claim 1 wherein said logic means generates logic signals which cause said data bus drivers to operate in the input mode when said processing unit generates a read control signal and an address signal corresponding to a read operation to read data from an off-chip peripheral.

6. The system of claim 1 wherein said logic means further comprises a decoding means for decoding said address signals to determine whether one of said on-chip peripherals is being accessed, and if one of said on-chip peripherals is being accessed, for generating an activating control signal and transmitting said activating control signal to the particular on-chip peripheral which is being accessed to activate said on-chip peripheral.

7. A semiconductor multi-device system incorporated on a single semiconductor chip capable of interacting with off-chip components including an off-chip processing means and off-chip peripherals, said semiconductor multi-device system comprising:

bus means for carrying address signals, data signals and control signals;

at least one on-chip peripheral connected to said bus means;

an on-chip processing unit connected to said bus means for generating onto said bus means, a read control signal, a bus acknowledge control signal which indicates that said on-chip processing unit is in control of said bus means, and an address signal uniquely associated with one of said on-chip or off-chip peripherals;

logic means connected to said bus means, for receiving said read control signal, said bus acknowledge control signal, and said address signal from said processing unit, and generating at least two logic signals in response thereof;

a plurality of data bus drivers responsive to said at least two logic signals generated by said logic means and connected to said bus means for driving data signals on and off said bus means, said plurality of data bus drivers selectably operating in one of at least three modes in response to said at least two logic signals; and a plurality of terminating conductors connected to said plurality of data bus drivers, said plurality of terminating conductors providing connections for said off-chip components;

wherein said at least three modes of said plurality of data bus drivers include: (1) an output mode wherein data signals received from said bus means are driven onto said plurality of terminating conductors, (2) an input mode wherein data signals appearing on said terminating conductors are driven onto said bus means, and (3) a high impedance mode wherein said bus means is electrically isolated from said terminating conductors; and wherein said at least two logic signals generated by said logic means cause said data bus drivers to operate in high impedance mode when said processing unit generates a read control signal, a bus acknowledge control signal and an address signal corresponding to a read operation to read data from at least one of said on-chip peripherals.

8. The multi-device system of claim 7 wherein said on-chip processing unit also generates onto said bus means an emulator signal and said logic means also receives as input said emulator signal which, when set to logic 1, causes said logic means to generate at least two logic signals which cause said data bus drivers to operate in the output mode when said processing unit generates a read control signal and an address signal corresponding to a read operation to read data from at least one of said on-chip peripherals, thereby allowing said off-chip processing means and off-chip peripherals to also read the data being read by said on-chip processing unit.

9. The system of claim 7, said on-chip processing unit generating a write control signal, and said logic means further receiving said write control signal as input, and generating in response thereof logic signals which cause said data bus drivers to operate in the output mode when said on-chip processing unit generates a write control signal, a bus acknowledge control signal and an address signal corresponding to a write operation to write data to at least one of said on-chip peripherals.

10. The system of claim 9 wherein said logic means generates logic signals which cause said data bus drivers to operate in the output mode when said on-chip processing unit generates a write control signal, a bus acknowledge signal and an address signal corresponding to a write operation to write data to at least one of said off-chip peripherals.

11. The system of claim 10 wherein said logic means generates logic signals which cause said data bus drivers to operate in the input mode when said on-chip processing unit generates a read control signal, a bus acknowledge signal and an address signal corresponding to a read operation to read data from at least one of said off-chip peripherals.

12. The system of claim 11 wherein said bus acknowledge control signal indicates whether said on-chip processing unit or said off-chip processing unit is in control of said bus means, and when said bus acknowledge signal indicates that said off-chip processing unit is in control of said bus means, said logic means generates logic signals which cause said data bus drivers to operate in the high impedance mode when said off-chip processing unit generates a read control or write control signal and an address signal corresponding respectively to a read or a write operation to read or write data from or to at least one of said off-chip peripherals.

13. The system of claim 12 wherein said logic means generates logic signals which cause said data bus drivers to operate in the input mode when said off-chip processing unit generates a write control signal and an address signal corresponding to a write operation to write data to at least one of said on-chip peripherals.

14. The system of claim 13 wherein said logic means generates logic signals which cause said data bus drivers to operate in the output mode when said off-chip processing unit generates a read control signal and an address signal corresponding to a read operation to read data from at least one of said on-chip peripherals.

15. The system of claim 7 wherein said logic means further comprises a decoding means for decoding said address signals to determine whether one of said on-chip peripherals is being accessed, and if one of said on-chip peripherals is being accessed, for generating an activating control signal and transmitting said activating control signal to the particular on-chip peripheral which is being accessed to activate said on-chip peripheral.

* * * * *